(12) United States Patent
Xu

(10) Patent No.: US 9,995,892 B2
(45) Date of Patent: Jun. 12, 2018

(54) OPTICAL COMMUNICATION MODULES

(71) Applicant: Finisar Corporation, Sunnyvale, CA (US)

(72) Inventor: Xiaojie Xu, Pleasanton, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days. days.

(21) Appl. No.: 15/611,713

(22) Filed: Jun. 1, 2017

(65) Prior Publication Data
US 2017/0351044 A1 Dec. 7, 2017

Related U.S. Application Data

(60) Provisional application No. 62/344,183, filed on Jun. 1, 2016.

(51) Int. Cl.
| | |
|---|---|
| *G02B 6/42* | (2006.01) |
| *G02B 6/34* | (2006.01) |
| *G02B 6/30* | (2006.01) |
| *G02B 6/44* | (2006.01) |
| *G02B 6/122* | (2006.01) |
| *G02B 6/12* | (2006.01) |
| *G02B 6/38* | (2006.01) |
| *H04B 10/50* | (2013.01) |
| *H04B 10/60* | (2013.01) |
| *H04B 10/80* | (2013.01) |

(52) U.S. Cl.
CPC .......... *G02B 6/4246* (2013.01); *G02B 6/122* (2013.01); *G02B 6/12004* (2013.01); *G02B 6/30* (2013.01); *G02B 6/34* (2013.01); *G02B 6/3893* (2013.01); *G02B 6/4214* (2013.01); *G02B 6/4256* (2013.01); *G02B 6/4281* (2013.01); *G02B 6/4403* (2013.01); *H04B 10/50* (2013.01); *H04B 10/60* (2013.01); *H04B 10/801* (2013.01); *G02B 2006/12061* (2013.01); *G02B 2006/12102* (2013.01); *G02B 2006/12114* (2013.01); *G02B 2006/12121* (2013.01)

(58) Field of Classification Search
None
See application file for complete search history.

(56) References Cited

U.S. PATENT DOCUMENTS

2016/0018601 A1* 1/2016 Gardes .................... G02B 6/30 385/37
2016/0231521 A1* 8/2016 Smith .................... G02B 6/383

* cited by examiner

*Primary Examiner* — Jerry Rahll
(74) *Attorney, Agent, or Firm* — Maschoff Brennen

(57) ABSTRACT

An optical assembly may include a platform disposed within a housing that has a limited space. The platform may be tilted by a first angle to fit a fiber array into the limited space of the housing. The optical assembly may also include a silicon photonics device mounted on the tilted platform. The silicon photonics device may include a grating coupler. The optical assembly may also include the fiber array directly coupled to the grating coupler on the silicon photonics device at a coupling position that deviates from a vertical coupling position by a second angle.

19 Claims, 6 Drawing Sheets

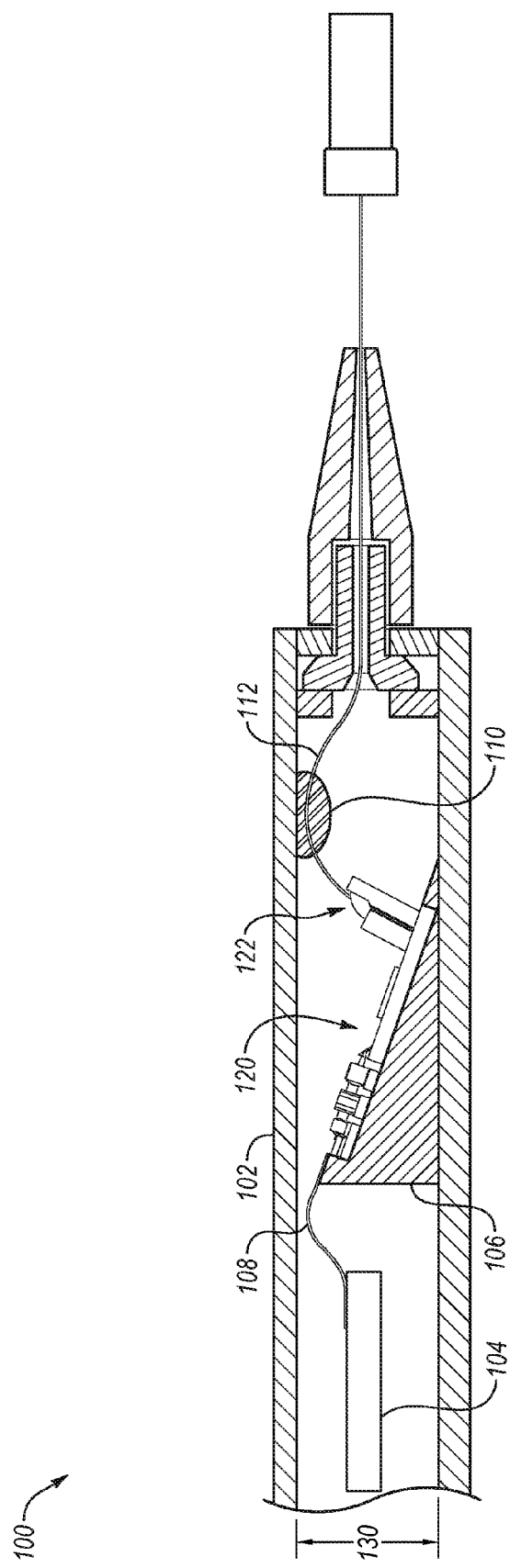

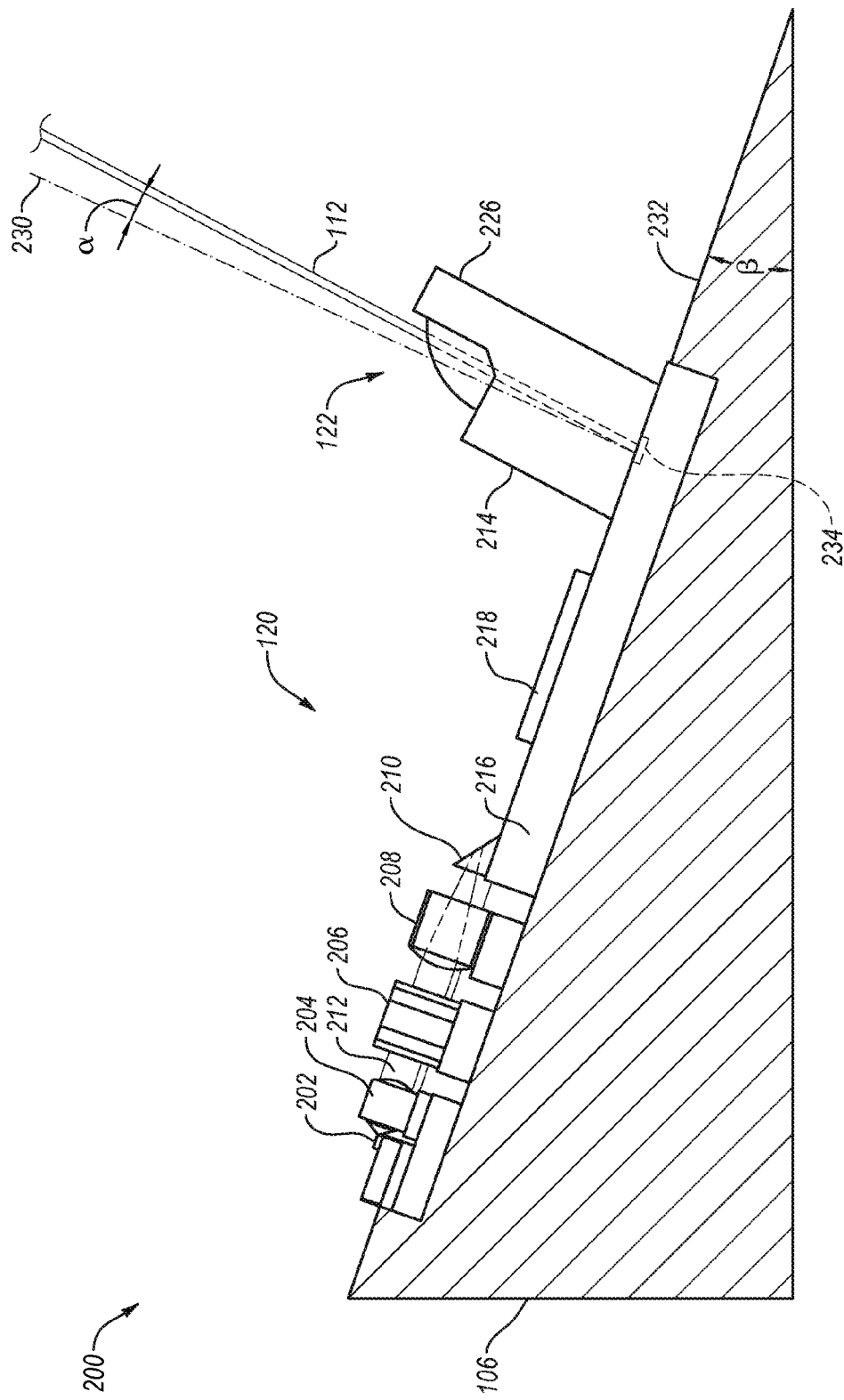

OPTICAL COMMUNICATION MODULES

CROSS-REFERENCE TO RELATED APPLICATION

This application claims the benefit of and priority to U.S. Provisional App. No. 62/344,183, filed Jun. 1, 2016, which is incorporated herein by reference in its entirety.

FIELD

Some embodiments described herein generally relate to optical communication modules.

BACKGROUND

Unless otherwise indicated herein, the materials described herein are not prior art to the claims in the present application and are not admitted to be prior art by inclusion in this section.

An optics transceiver with a small form factor may have a limited space. In some applications, it may be difficult to enclose various components into the optics transceiver due to the limited space available in the transceiver.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to optical communication modules, such as optics transceivers or transponders.

In an example embodiment, an optical assembly is described. The optical assembly may include a platform disposed within a housing that may have a limited space. The platform may be tilted by a first angle to fit a fiber array into the limited space of the housing. The optical assembly may also include a silicon photonics device mounted on the tilted platform. The silicon photonics device may include a grating coupler. The optical assembly may also include the fiber array directly coupled to the grating coupler on the silicon photonics device at a coupling position that deviates from a vertical coupling position by a second angle.

In another example embodiment, an optical assembly may include a housing with a footprint of a small form factor. The optical assembly may also include a platform disposed within the housing and tilted with a first angle of about 20 degrees. The optical assembly may also include a silicon photonics device mounted on the tilted platform. The silicon photonics device may include a grating coupler. The optical assembly may also include a v-groove fiber array directly butt coupled to the grating coupler on the silicon photonics device at a coupling position that deviates from a vertical coupling position by a second angle of about 8 degrees. The vertical coupling position may be perpendicular to a slope of the platform. The v-groove fiber array may be bent with a radius of about 6 millimeters. The platform may be tilted by the first angle to fit the bent v-groove fiber array into the housing.

In yet another example embodiment, an optical communication module is described. The optical communication module may include a housing with a limited space. The optical communication module may also include a printed circuit board (PCB) disposed within the housing. The optical communication module may also include a flexible circuit configured to couple the PCB to a silicon photonics device. The optical communication module may also include the silicon photonics device mounted on a platform that is disposed within the housing and tilted by a first angle. The silicon photonics device may include a grating coupler. The optical communication module may also include a fiber array directly coupled to the grating coupler on the silicon photonics device at a coupling position that may deviate from a vertical coupling position by a second angle. The platform may be tilted by the first angle to fit the fiber array into the limited space of the housing.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1A is a partial cross-sectional view of an example optical assembly that may be part of an example optical communication module;

FIG. 2A is a detailed view of an example silicon photonics device coupled to an example fiber array;

DETAILED DESCRIPTION OF SOME EXAMPLE EMBODIMENTS

Figure 1B:
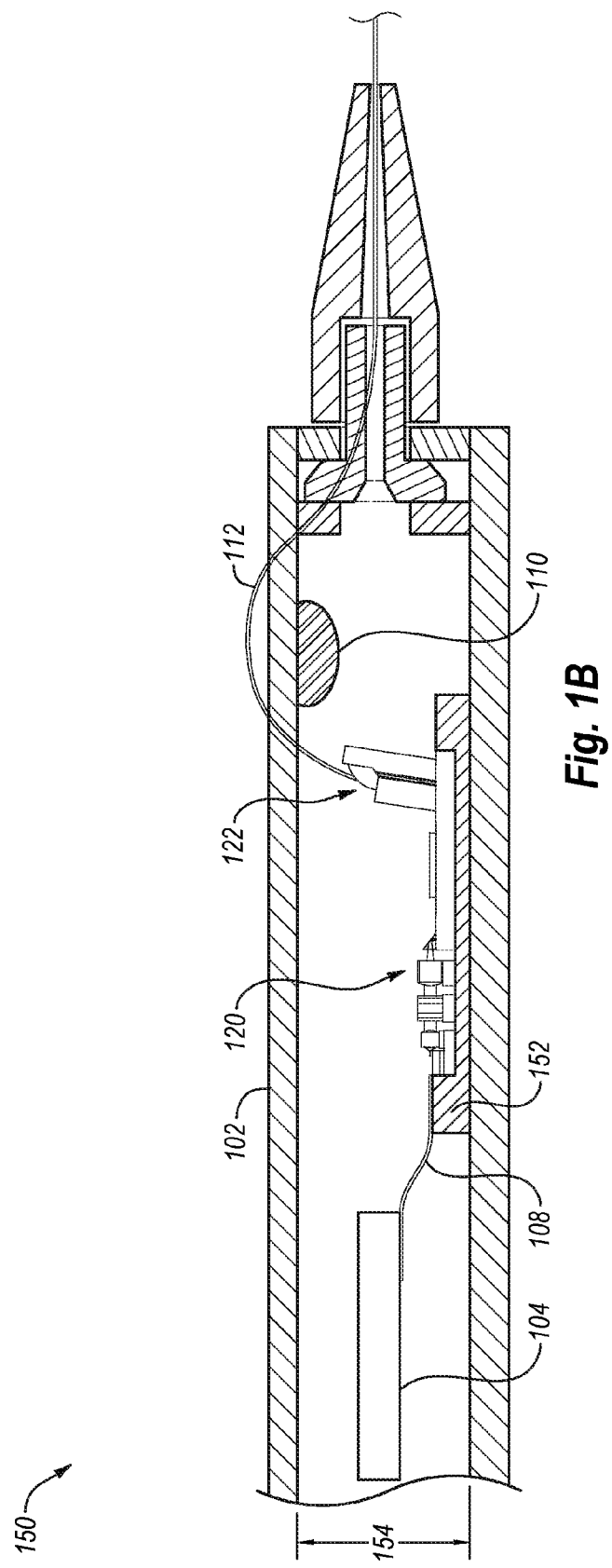
FIG. 1B is a partial cross-sectional view of another example optical assembly.

Embodiments described herein generally relate to optical communication modules, such as transceivers and transponders.

Some embodiments described herein may include an optical assembly. The optical assembly may include a platform disposed within a housing that may have a footprint of a small form factor. The platform may be tilted with a first angle (e.g., 15 degrees, 20 degrees, 25 degrees, or another suitable angle value). The optical assembly may also include a silicon photonics device mounted on the tilted platform. The silicon photonics device may include a grating coupler. The optical assembly may also include a v-groove fiber array directly butt coupled to the grating coupler on the silicon photonics device. The v-groove fiber array may be coupled to the grating coupler at a coupling position that may deviate from a vertical (or orthogonal) coupling position by a second angle (e.g., 6 degrees, 8 degrees, or another suitable angle value). The v-groove fiber array may be bent with a radius that may satisfy a bending requirement. The platform may be tilted by the first angle to fit the bent v-groove fiber array into the housing.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1A is a partial cross-sectional view of an example optical assembly 100 that may be part of an example optical communication module, arranged in accordance with at least one embodiment described herein. The example optical communication module may include a low profile fiber optics communication module including a 12× small form-factor pluggable (CXP) transceiver, a C form-factor pluggable (CFP) transceiver, a CFP4 transceiver, a quad small form factor pluggable (QSFP) transceiver, or other low profile fiber optics communication module. The optical assembly 100 may include a platform 106, a silicon photonics device 120, and a fiber array 122. In some embodiments, the optical assembly 100 may also include a housing 102, a printed circuit board (PCB) 104, a flexible circuit 108, and/or any other suitable components.

The housing 102 may be configured to enclose the PCB 104, the flexible circuit 108, the platform 106, the silicon photonics device 120, the fiber array 122 that includes a fiber or a ribbon fiber cable 112, and any other suitable components. The housing 102 may have a limited space with a vertical dimension 130. In some embodiments, the housing 102 may have a footprint of a small form factor such as CXP, CFP, CFP4, QSFP, or any other suitable form factor and/or may conform to a small form factor multisource agreement (MSA) such as the CXP MSA, the CFP MSA, the CFP4 MSA, the QSFP MSA, or any other suitable MSA. In some embodiments, the vertical dimension 130 may have a value of about 8 millimeters (mm). Alternatively, the vertical dimension 130 may have another numeric value. As used herein, the term "about" as applied to a value may indicate a range of ±15% of the stated value.

The platform 106 may be disposed within the housing 102. The silicon photonics device 120 may be mounted on the platform 106. For example, the silicon photonics device 120 may be embedded on and/or coupled to a slope of the platform 106. The flexible circuit 108 may be configured to communicatively couple the silicon photonics device 120 to the PCB 104. The fiber array 122 that may include the ribbon cable 112 and other components may be directly coupled to the silicon photonics device 120. For example, the ribbon cable 112 may be directly and/or optically butt coupled to a grating coupler of the silicon photonics device 120 in a near-vertical coupling position in a reference frame of the grating coupler (although angled with respect to the housing 102). The silicon photonics device 120, the fiber array 122, and the near-vertical coupling position are described below in more detail with reference to FIGS. 2A-2B.

In some embodiments, the platform 106 may be mounted on a first wall of the housing 102 (e.g., bottom wall of the housing 102 in FIG. 1A) and an upper surface of the platform 106 to which the silicon photonics device 120 is coupled may be tilted with an angle relative to the first wall of the housing 102. The tilted angle may have a value of about 20 degrees or another numeric value relative to the first wall of the housing 102. The tilted angle may be determined based on one or more factors such as a dimension of a space in the housing 102 (e.g., the vertical dimension 130 of the housing 102), components to be enclosed in the housing 102, attributes of the fiber array 122 including attributes of the ribbon cable 112, or any other suitable factors or combination thereof. The ribbon cable 112 may include multiple fibers. The ribbon cable 112 may be attached to a second wall of the housing 102 (e.g., top wall of the housing 102 in FIG. 1A) by epoxy 110 or other suitable glue material, adhesive, one or more fasteners, or other elements or combinations thereof. The first wall and the second wall of the housing 102 may be two opposite walls of the housing 102.

As described herein, the tilted angle of the platform 106 (and more particularly of its upper surface) may be configured such that the fiber array 122 that couples to the silicon photonics device 120 in a near-vertical coupling position may fit into the housing 102 without breaking the ribbon cable 112 or deteriorating performance of the ribbon cable 112, e.g., by requiring that individual fibers within the ribbon cable 112 bend with a radius less than a critical bend radius of the fibers. For example, the vertical dimension 130 of the housing 102 may have a value of about 8 mm. When the silicon photonics device 120 rests on the platform 106 tilted with an angle of 20 degrees or another suitable angle value, the ribbon cable 112 may be bent with a radius of about 6 mm or another suitable radius to fit into the limited vertical dimension 130 of the housing 102 with low loss and mechanical reliability. Example benefits of mounting the silicon photonics device 120 on the tilted platform 106 are illustrated with combined reference to FIGS. 1A and 1B.

FIG. 1B is a partial cross-sectional view of another example optical assembly 150, arranged in accordance with at least one embodiment described herein. Comparing FIG. 1B with FIG. 1A, the optical assembly 100 of FIG. 1A may include the silicon photonics device 120 mounted on the tilted platform 106 while the optical assembly 150 of FIG. 1B may include the silicon photonics device 120 mounted on a horizontal platform 152. In both FIGS. 1A and 1B, the fiber array 122 (or the ribbon cable 112 of the fiber array 122) may be directly and/or optically coupled to a grating coupler on the silicon photonics device 120 in a near-vertical coupling position.

Since a vertical dimension 154 of the optical assembly 150 may be limited, the optical assembly 150 may not have enough space to fit the ribbon cable 112 into the housing 102, where the ribbon cable 112 may couple to the grating coupler on the silicon photonics device 120 in the near-vertical coupling position and may not be bent too much (e.g., to a radius less than the critical bend radius) to break the fibers in the ribbon cable 112 and/or to deteriorate performance of the fibers. For example, light may escape from fiber cores of the ribbon cable 112 if a bend radius of the ribbon cable 112 is less than its critical bend radius. As illustrated in FIG. 1B, the ribbon cable 112 may need to extend outside the limited space of the housing 102 when the silicon photonics device 120 is mounted on the horizontal platform 152 to keep its bend radius greater than its critical bend radius, which makes it impossible to assemble the ribbon cable 112 into the housing 102 according to the configuration of FIG. 1B.

FIG. 2A is a detailed view 200 of the silicon photonics device 120 coupled to the fiber array 122 of FIG. 1A, arranged in accordance with at least one embodiment described herein. The silicon photonics device 120 is mounted on a slope 232 or upper surface of the tilted platform 106 with an angle β. That is, the slope 232 may be at an angle β relative to horizontal and/or the silicon photonics device 120 my generally be arranged at an angle β relative to horizontal. The angle "β" may have a value of about 15 degrees, 20 degrees, or another suitable value. The silicon photonics device 120 may include one or more laser sources 202, one or more lenses 204, one or more isolators 206, one or more focusing lenses 208, one or more prisms 210, a photonic integrated circuit (PIC) 216, an integrated circuit (IC) 218, a grating coupler 234, and any other suitable components. Alternatively or additionally, the silicon photonics device 120 may include a transmit optical subassembly (TOSA) and/or a receive optical subassembly (ROSA).

The one or more laser sources 202 may include one or more lasers or laser diodes each configured to emit a corresponding light beam 212 that may propagate through various components of the silicon photonics device 120 to the fiber array 122. In some embodiments, the one or more laser sources 202 may include one or more vertical-cavity surface-emitting of lasers.

The one or more light beams 212 may respectively propagate through the one or more lenses 204, the one or more isolators 206, the one or more focusing lenses 208, the one or more prisms 210, and the PIC 216. The one or more light beams 212 may propagate to the ribbon cable 112 through the grating coupler 234 of the PIC 216. The grating coupler 234 may allow beam spot conversion from a mode field diameter (MFD) with a range of 300 nanometers (nm) to 500 nm (or another suitable range) in a confined silicon (Si) waveguide to a MFD of about 10 micrometer (μm) (or another suitable value) in a single mode fiber (SMF), and vice versa. The grating coupler 234 may allow on chip testing, which is beneficial to mass production of a silicon photonics wafer.

The fiber array 122 may include a v-groove fiber array pigtail. In some embodiments, the fiber array 122 may include the ribbon cable 112, a cover plate 214, and a v-groove array 226. The cover plate 214 may be made of glass or other suitable material. The v-groove array 226 may be made of glass, silicon, or other suitable material. The v-groove array 226 may allow efficient coupling of the ribbon cable 112 to a planar-integrated waveguide through the grating coupler 234. Alternatively, the fiber array 122 may include a single mode fiber rather than a ribbon cable.

As illustrated in FIG. 2A, the fiber array 122 or the ribbon cable 112 may be directly and/or optically butt coupled to the grating coupler 234 in a near-vertical coupling position. A vertical coupling position 230 shown as a dashed-dotted line in FIG. 2A may represent a position of a ribbon cable disposed perpendicular to the slope 232 of the platform 106. The near-vertical coupling position of the ribbon cable 112 may represent a position of angle α. The deviation angle α may have a value of about 6 degrees, 8 degrees, or another suitable value. It may be beneficial to place the ribbon cable 112 in the near-vertical coupling position rather than the vertical coupling position 230 so that light that may refract back to the ribbon cable 112 may be reduced or minimized. The cover plate 214 and/or the v-groove array 226 may have a front facet which is butt coupled to the grating coupler 234 and/or upper surface of the PIC 216. The front facet may be angle polished to an angle (e.g., the angle α in some embodiments) such that when the front facet is butt coupled to the grating coupler 234 and/or upper surface of the PIC 216, the fiber array 122 and/or ribbon cable 112 is/are in the near-vertical coupling position.

Figure 2B:
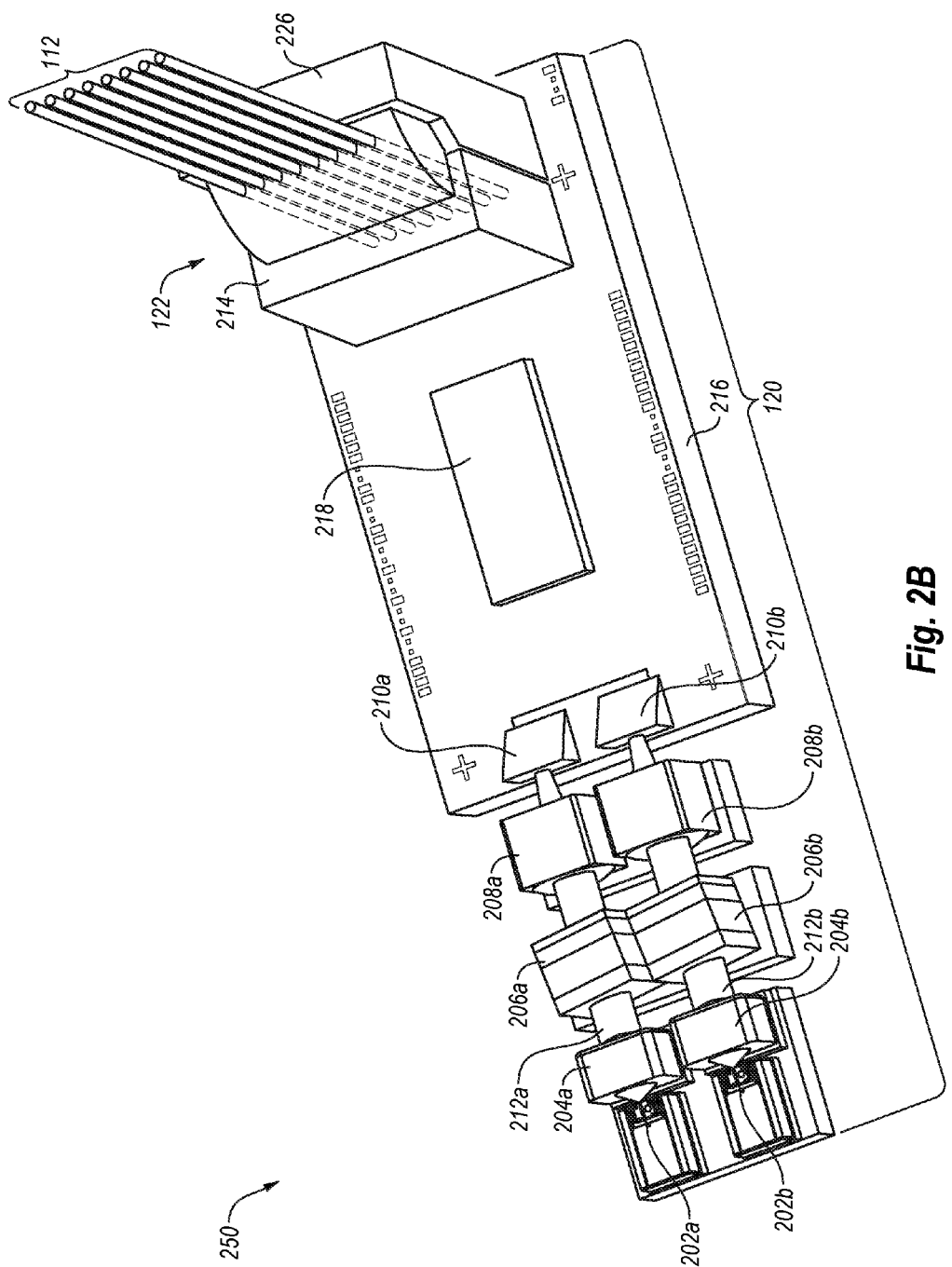
FIG. 2B is a perspective view of the example silicon photonics device coupled to the example fiber array of FIG. 2A.

FIG. 2B is a perspective view 250 of the silicon photonics device 120 coupled to the fiber array 122 of FIG. 2A, arranged in accordance with at least one embodiment described herein. The silicon photonics device 120 may include laser sources 202a and 202b, lenses 204a and 204b, isolators 206a and 206b, focusing lenses 208a and 208b, and prisms 210a and 210b, which may be similar or identical to the laser sources 202, the lenses 204, the isolators 206, the focusing lenses 208, and the prisms 210 of FIG. 2A respectively. The silicon photonics device 120 may also include the PIC 216, the IC 218, the grating coupler 234 (not visible in FIG. 2B), and any other suitable components. Light beams 212a and 212b may propagate through various components of the silicon photonics device 120 to the ribbon cable 112.

The fiber array 122 may include the cover plate 214, the ribbon cable 112, and the v-groove array 226. The fiber array 122 may be coupled to the PIC 216 such that the ribbon cable 112 may be directly butt coupled to the grating coupler 234 in the near-vertical coupling position illustrated in FIG. 2A.

Figure 3A:
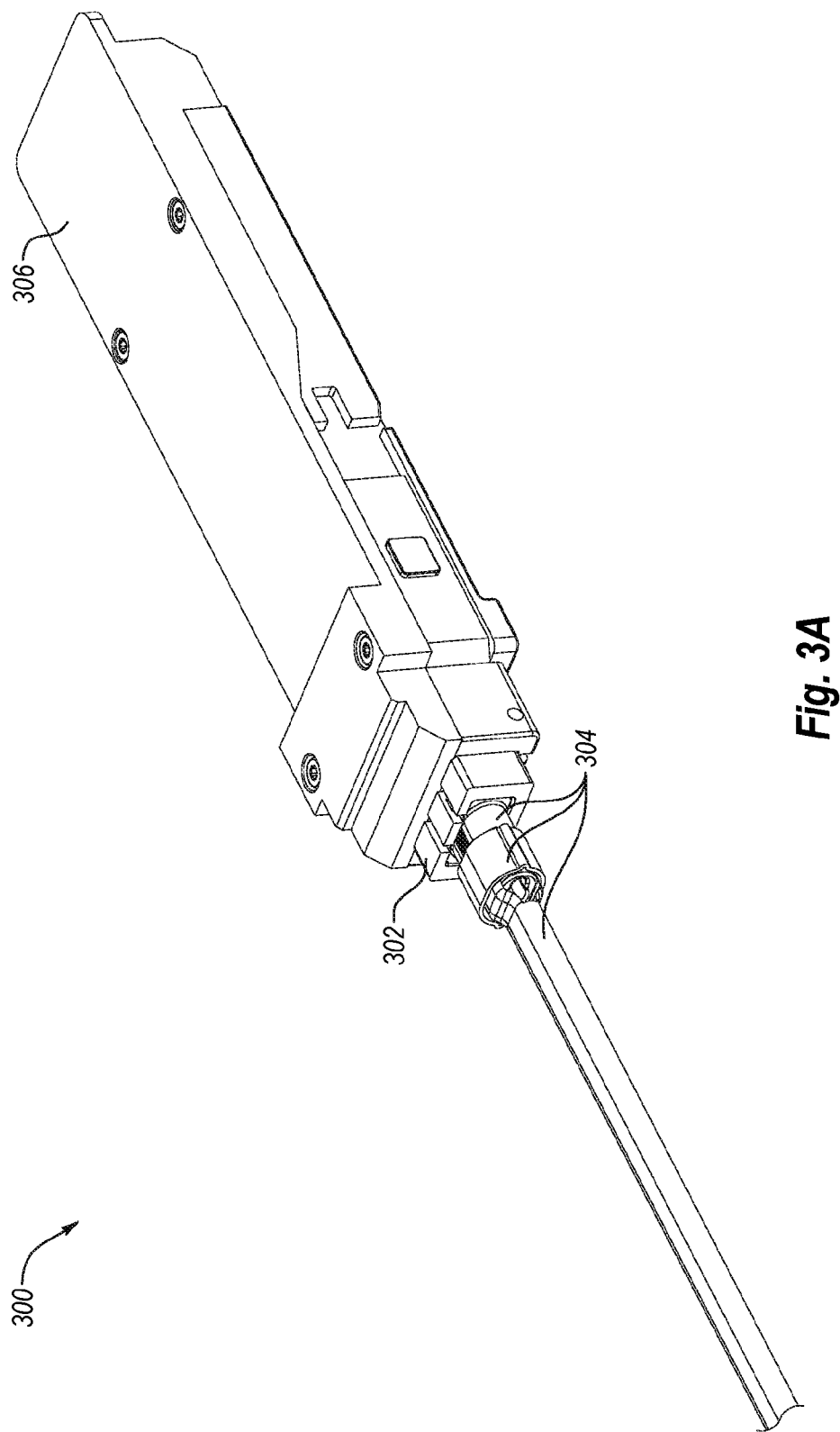
FIG. 3A is a perspective view of an example optical communication module.

FIG. 3A is a perspective view 300 of an example optical communication module, arranged in accordance with at least one embodiment described herein. The optical communication module may include a housing 306, one or more components enclosed within the housing 306 (e.g., a silicon photonics device, a fiber array), an adaptor 302, a cable assembly 304, and any other suitable components. The housing 306 may be similar or identical to the housing 102 of FIG. 1A. The adaptor 302 may be configured to receive the cable assembly 304 so that the cable assembly 304 may be configured to couple to a ribbon cable of the fiber array. The adaptor 302 may include a multi-fiber push-on (MPO) adaptor or another suitable type of adaptor. The cable assembly 304 may include a quad small form-factor pluggable (QSFP) cable assembly for CFP4 or another suitable type of cable assembly.

Figure 3B:
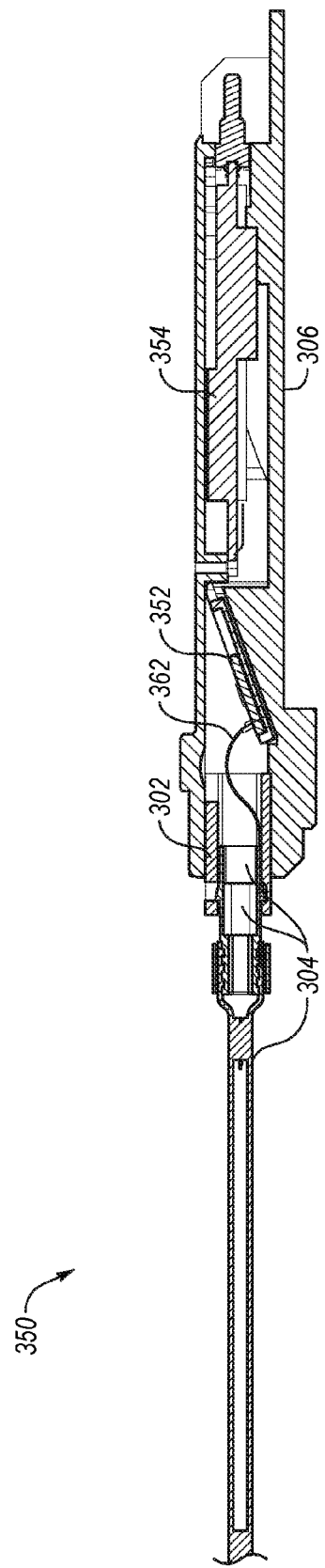
FIG. 3B is a cross-sectional view of the example optical communication module of FIG. 3A, all arranged in accordance with at least one embodiment described herein.

FIG. 3B is a cross-sectional view 350 of the example optical communication module of FIG. 3A, arranged in accordance with at least one embodiment described herein. The housing 306 may enclose a PCB 354, a silicon photonics device 352 on a tilted platform, a fiber array 362, and any other suitable components. The PCB 354, the silicon photonics device 352, and the fiber array 362 may be similar or identical to the PCB 104, the silicon photonics device 120, and the fiber array 122 of FIG. 1A respectively.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical assembly comprising:
   a platform disposed within a housing that has a limited enclosed space at least partially defined between a top wall and a bottom wall of the housing which are vertically separated and at least partially defined between opposing sidewalls of the housing that extend vertically between the top wall and the bottom wall, the platform including a tilted upper surface being tilted by a first angle relative to the bottom wall of the housing to fit a fiber array into the limited enclosed space of the housing;
   a silicon photonics device mounted on the tilted upper surface of the platform, the silicon photonics device including a grating coupler; and
   the fiber array directly coupled to the grating coupler on the silicon photonics device at a coupling position that deviates from a reference coupling position by a second angle, the reference coupling position oriented perpendicular to the tilted upper surface of the platform;
   wherein the silicon photonics device further comprises:
      a laser source mounted on the tilted upper surface of the platform, the laser source configured to emit a light beam that propagates through at least a portion of the silicon photonics device;
      a lens mounted on the tilted upper surface of the platform and positioned to receive the light beam emitted from the laser source;
      an isolator mounted on the tilted upper surface of the platform and positioned to receive the light beam after it propagates through the lens;
      a focusing lens mounted on the tilted upper surface of the platform and positioned to receive the light beam after it propagates through the isolator;
      a photonic integrated circuit (PIC) mounted on the tilted upper surface of the platform, the grating coupler included in the PIC to couple the light beam out of the PIC and into the fiber array; and
      a prism mounted on the PIC to couple the light beam that propagates through the focusing lens into the PIC.

2. The optical assembly of claim 1, wherein the first angle has a value of about 20 degrees.

3. The optical assembly of claim 1, wherein the second angle has a value of about 8 degrees.

4. The optical assembly of claim 1, wherein the fiber array includes a v-groove fiber array.

5. The optical assembly of claim 1, wherein the fiber array includes a single mode fiber.

6. The optical assembly of claim 1, wherein the silicon photonics device includes a transmit optical subassembly (TOSA) and a receive optical subassembly (ROSA).

7. The optical assembly of claim 1, wherein the grating coupler is mounted on the PIC.

8. The optical assembly of claim 1, wherein the housing has a footprint of a small form factor module including a 12× small form-factor pluggable (CXP) transceiver, a C form-factor pluggable (CFP) transceiver, a CFP4 transceiver, or a quad small form factor pluggable (QSFP) transceiver.

9. The optical assembly of claim 1, wherein the limited enclosed space of the housing includes a vertical dimension of about 8 millimeters and the fiber array is bent with a radius of about 6 millimeters to fit into the vertical dimension of the housing.

10. An optical assembly comprising:
    a housing with a footprint of a small form factor module, the housing comprising a top wall, a bottom wall vertically separated from the top wall, and two opposing sidewalls that extend vertically between the top wall and the bottom wall, and the small form factor module includes a 12× small form-factor pluggable (CXP) transceiver, a C form-factor pluggable (CFP) transceiver, a CFP4 transceiver, or a quad small form factor pluggable (QSFP) transceiver;
    a platform disposed within the housing, the platform including a tilted upper surface arranged at a first angle of about 20 degrees relative to the bottom wall of the housing;
    a silicon photonics device mounted on the tilted upper surface of the platform, the silicon photonics device including:
       a grating coupler;
       a laser source mounted on the tilted upper surface of the platform, the laser source configured to emit a light beam that propagates through at least a portion of the silicon photonics device;
       a lens mounted on the tilted upper surface of the platform and positioned to receive the light beam emitted from the laser source;
       an isolator mounted on the tilted upper surface of the platform and positioned to receive the light beam after it propagates through the lens;
       a focusing lens mounted on the tilted upper surface of the platform and positioned to receive the light beam after it propagates through the isolator;
       a photonic integrated circuit (PIC) mounted on the tilted upper surface of the platform, the grating coupler included in the PIC to couple the light beam out of the PIC; and
       a prism mounted on the PIC to couple the light beam that propagates through the focusing lens into the PIC; and
    a v-groove fiber array directly butt coupled to the grating coupler on the silicon photonics device at a coupling position that deviates from a reference coupling position by a second angle of about 8 degrees, the reference coupling position being perpendicular to a slope of the tilted upper surface of the platform,
    wherein:
       the v-groove fiber array is bent with a radius of about 6 millimeters;

the tilted upper surface of the platform is tilted by the first angle to fit the bent v-groove fiber array into the housing;

the grating coupler is configured to convert a beam spot of the light beam from a first mode field diameter (MFD) to a second MFD that is greater than the first MFD;

the first MFD is in a range from 300 nanometers to 500 nanometers; and the second MFD is about 10 micrometers.

11. An optical communication module comprising:

a housing with a limited enclosed space at least partially defined between a top wall and a bottom wall of the housing which are vertically separated and at least partially defined between opposing sidewalls of the housing that extend vertically between the top wall and the bottom wall;

a printed circuit board (PCB) disposed within the housing;

a flexible circuit configured to couple the PCB to a silicon photonics device;

the silicon photonics device mounted on a platform that is disposed within the housing, the platform including a tilted upper surface tilted by a first angle relative to the bottom wall of the housing, the silicon photonics device including:

a grating coupler;

a laser source mounted on the tilted upper surface of the platform, the laser source configured to emit a light beam that propagates through at least a portion of the silicon photonics device;

a lens mounted on the tilted upper surface of the platform and positioned to receive the light beam emitted from the laser source;

an isolator mounted on the tilted upper surface of the platform and positioned to receive the light beam after it propagates through the lens;

a focusing lens mounted on the tilted upper surface of the platform and positioned to receive the light beam after it propagates through the isolator;

a photonic integrated circuit (PIC) mounted on the tilted upper surface of the platform, the grating coupler included in the PIC to couple the light beam out of the PIC;

a prism mounted on the PIC to couple the light beam that propagates through the focusing lens into the PIC, wherein each of the laser source, the lens, the isolator, the focusing lens, and the prism are optically aligned in parallel fashion along the tilted upper surface of the platform such that the light beam emitted from the laser source propagates through each of at least the lens, the isolator, the focusing lens, and the prism before propagating through the PIC;

a fiber array directly coupled to the grating coupler on the silicon photonics device at a coupling position that deviates from a reference coupling position by a second angle, wherein:

the upper surface of the platform is tilted by the first angle to fit the fiber array into the limited enclosed space of the housing, the reference coupling position is perpendicular to the tilted upper surface of the platform; and the fiber array includes a v-groove fiber array;

a cover plate directly butt coupled to both the grating coupler and the PIC, the cover plate configured to enclose the coupling of the fiber array to the grating coupler; and a fastener configured to couple a portion of the fiber array, at a position along the fiber array that is outside of the cover plate, to the top wall such that the fiber array is bent less than a critical bend radius of the fiber array, wherein a front facet of one or both of the v-groove fiber array or the cover plate is angle polished to the second angle.

12. The optical communication module of claim 11, further comprising an adaptor configured to receive a cable assembly, wherein the cable assembly is configured to couple to the fiber array.

13. The optical communication module of claim 12, wherein the adaptor includes a multi-fiber push-on (MPO) adaptor and the cable assembly includes a quad small form-factor pluggable (QSFP) cable assembly.

14. The optical communication module of claim 11, wherein the first angle has a value of about 20 degrees and the second angle has a value of about 8 degrees.

15. The optical communication module of claim 11, wherein the fiber array includes a single mode fiber.

16. The optical communication module of claim 11, wherein the silicon photonics device includes a transmit optical subassembly (TOSA) and a receive optical subassembly (ROSA).

17. The optical communication module of claim 11, wherein the grating coupler is mounted on the PIC.

18. The optical communication module of claim 11, wherein the housing has a footprint of a small form factor module including a 12× small form-factor pluggable (CXP) transceiver, a C form-factor pluggable (CFP) transceiver, a CFP4 transceiver, or a quad small form factor pluggable (QSFP) transceiver.

19. The optical communication module of claim 11, wherein:

the grating coupler is configured to convert a beam spot of the light beam from a first mode field diameter (MFD) to a second MFD that is greater than the first MFD;

the first MFD is in a range from 300 nanometers to 500 nanometers; and the second MFD is about 10 micrometers.

* * * * *